United States Patent
Campbell et al.

(10) Patent No.: US 12,136,856 B2
(45) Date of Patent: Nov. 5, 2024

(54) HAIRPIN CONDUCTOR FOR AN ELECTRIC MOTOR STATOR AND METHOD OF FORMING THE HAIRPIN CONDUCTOR

(71) Applicant: GM GLOBAL TECHNOLOGY OPERATIONS LLC, Detroit, MI (US)

(72) Inventors: John D. Campbell, Rochester Hills, MI (US); Edward L. Kaiser, Orion, MI (US); Elizabeth Pepper, Royal Oak, MI (US); Caroline Bolt, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

(21) Appl. No.: 17/858,214

(22) Filed: Jul. 6, 2022

(65) Prior Publication Data
US 2024/0014719 A1   Jan. 11, 2024

(51) Int. Cl.
*H02K 15/06* (2006.01)
*H02K 1/16* (2006.01)
*H02K 3/28* (2006.01)
*H02K 15/085* (2006.01)

(52) U.S. Cl.
CPC ............. *H02K 15/064* (2013.01); *H02K 1/16* (2013.01); *H02K 3/28* (2013.01); *H02K 15/085* (2013.01)

(58) Field of Classification Search
CPC .. H02K 3/28; H02K 3/12; H02K 3/14; H02K 3/50
See application file for complete search history.

(56) References Cited

U.S. PATENT DOCUMENTS

| | | | | |
|---|---|---|---|---|
| 7,622,843 B2 * | 11/2009 | Cai | ............... | H02K 3/28 310/179 |
| 7,805,825 B2 * | 10/2010 | Guercioni | .......... | H02K 15/0428 310/201 |
| 10,900,531 B2 * | 1/2021 | Dawson | ................. | B21F 35/00 |
| 2015/0214820 A1 * | 7/2015 | Geoffrion | ............ | B23K 11/002 219/78.16 |

* cited by examiner

*Primary Examiner* — Tulsidas C Patel
*Assistant Examiner* — Mohammed Ahmed Qureshi
(74) *Attorney, Agent, or Firm* — Quinn IP Law

(57) ABSTRACT

A hairpin conductor includes two wire segments each having respective first and second ends and a respective middle region. The segments are disposed in a side-by-side orientation such that their first ends are proximate each other and their second ends are proximate each other. The first ends are welded to each other and the second ends are welded to each other, or the middle regions are welded to each other, thereby providing a welded wire assembly, which is bent such that the two wire segments are bent equally to form the hairpin conductor. The hairpin conductor has a primary bend in the middle regions to form an apex thereat and first and second secondary bends in the two wire segments nearer to the apex than to the first and second ends to form respective first and second shoulders thereat. A method of forming the hairpin conductor is also presented.

20 Claims, 9 Drawing Sheets

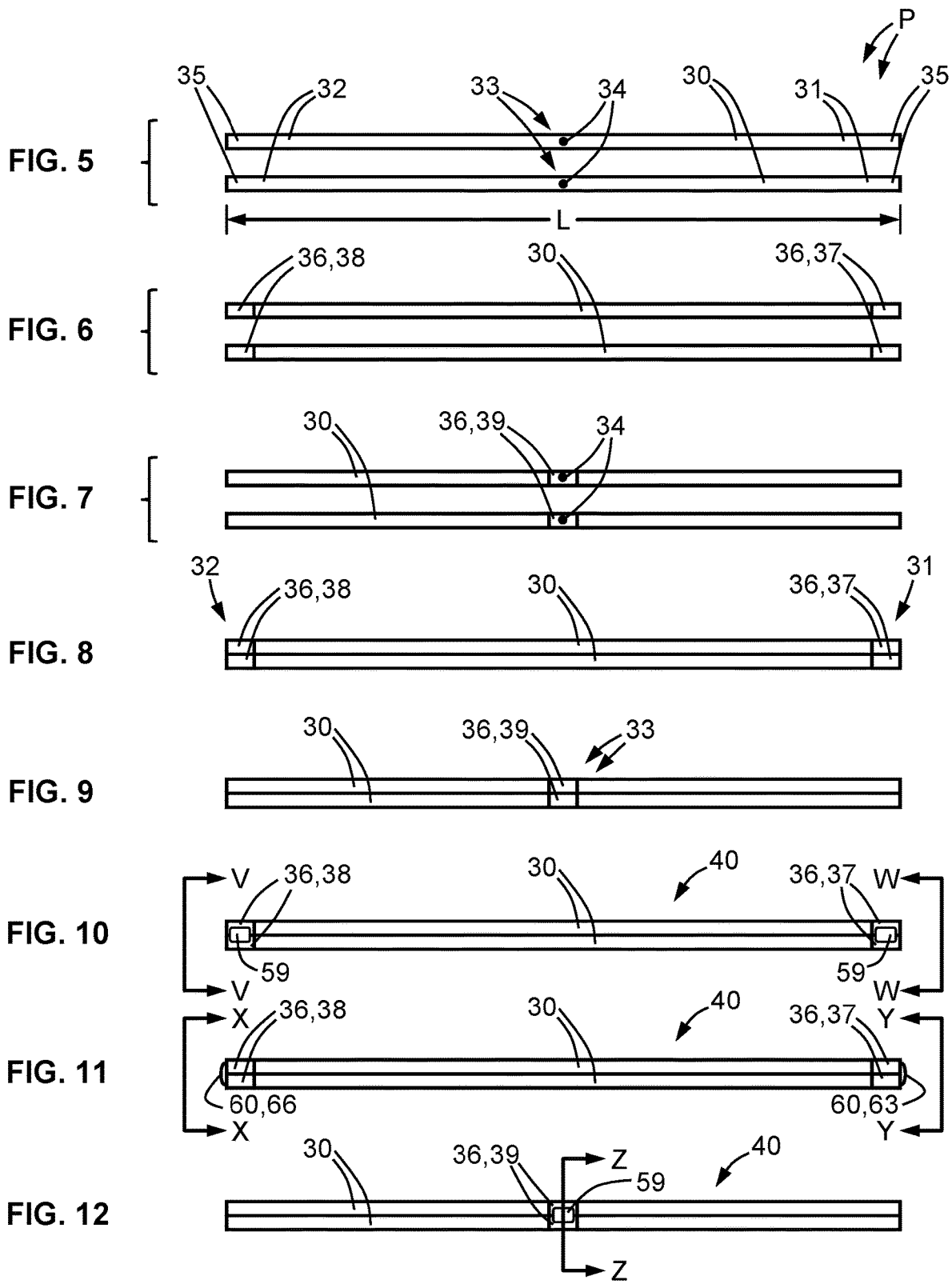

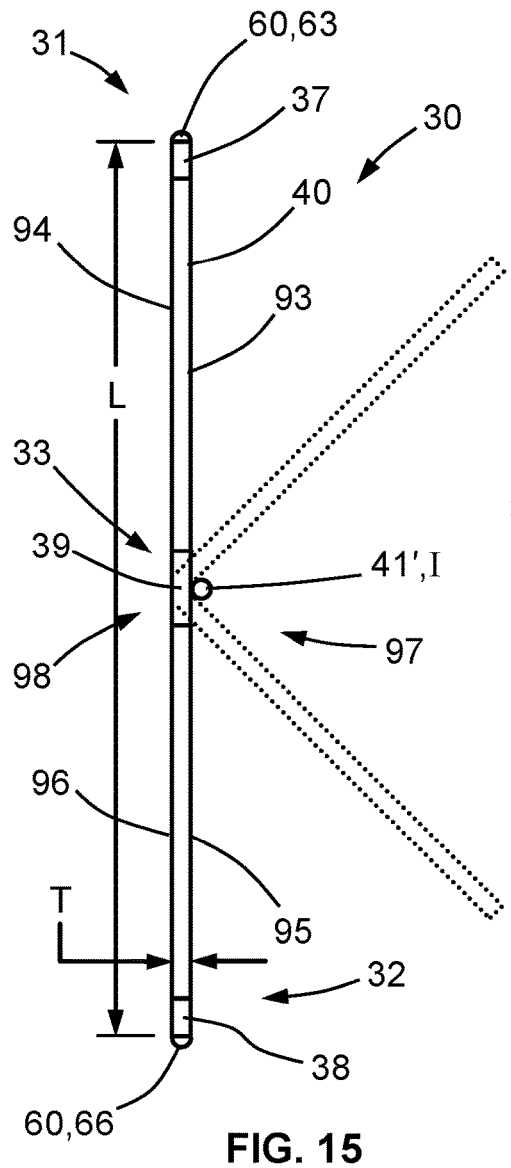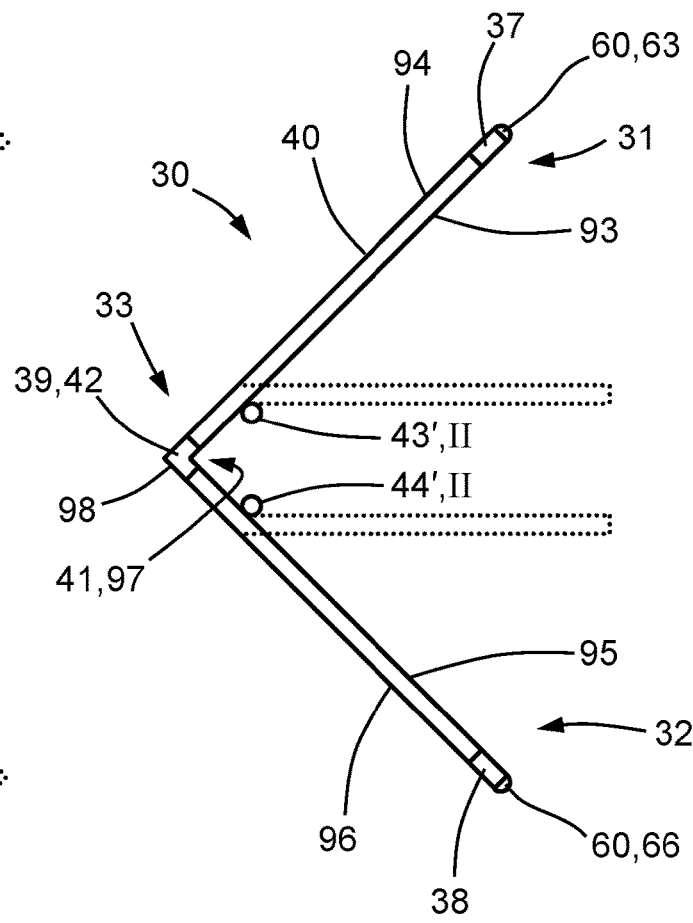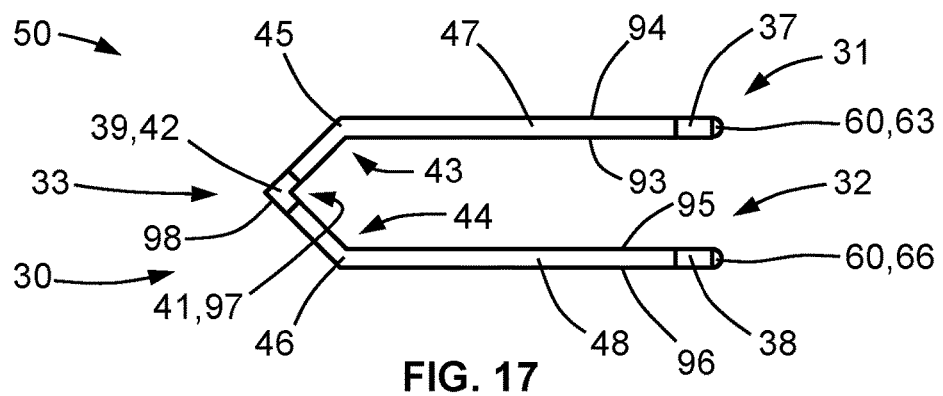
FIG. 15          FIG. 16
FIG. 17

HAIRPIN CONDUCTOR FOR AN ELECTRIC MOTOR STATOR AND METHOD OF FORMING THE HAIRPIN CONDUCTOR

INTRODUCTION

This disclosure relates to hairpin conductors for electric motor stators and to methods of forming such hairpin conductors.

Electric motors contain a stationary stator interfaced with a rotating rotor. The stator contains a multiplicity of windings which may be wound out of wire or which may be made out of so-called hairpin conductors which are inserted into a stator core and then operatively welded together at the ends of the hairpins.

SUMMARY

According to one embodiment, a method of forming a hairpin conductor includes: (i) providing two straightened wire segments each having a predetermined length, respective first and second ends, and a respective middle region located between the respective first and second ends; (ii) stripping a respective portion of each of the two wire segments at the respective first and second ends of each wire segment to produce respective first and second stripped end portions thereat and/or at the respective middle region of each wire segment to produce a stripped middle portion thereat; (iii) disposing the two wire segments beside each other such that their first ends are disposed proximate each other and their second ends are disposed proximate each other; (iv) welding the first stripped end portions to each other and the second stripped end portions to each other and/or the stripped middle portions to each other, to produce a welded wire assembly; and (v) bending the welded wire assembly while maintaining the two wire segments beside each other to form the hairpin conductor, wherein the hairpin conductor has a primary bend in the middle regions of the two wire segments to form an apex thereat, and first and second secondary bends in the two wire segments nearer to the apex than to the first and second ends to form respective first and second shoulders thereat.

The bending of the welded wire assembly provides a first leg extending from the first shoulder to the first ends of the two wire segments and a second leg extending from the second shoulder to the second ends of the two wire segments, wherein the first and second legs are disposed parallel to each other. The stripping step may be performed by laser-stripping and/or by mechanical action, and the welding step may be performed by laser welding, micro tungsten inert gas (TIG) welding or resistance brazing.

The method may also include extracting a length of wire from a coil of the wire, and straightening the length of wire to produce a run of straightened wire. Further, the method may additionally include conditioning the run of straightened wire to assure a predetermined cross-sectional profile of the straightened wire, as well as cutting the run of straightened wire to the predetermined length to produce the two straightened wire segments.

The two wire segments may be coated with a dielectric material, and the stripping step may remove the dielectric material from the stripped portions of the two wire segments. During the bending step, the two wire segments may be maintained in a side-by-side orientation such that the two wire segments are bent equally. Also, during the welding step, the two wire segments may be maintained in a side-by-side orientation such that the first stripped end portions together present a first inner seam, a first outer seam and a first end face, the second stripped end portions together present a second inner seam, a second outer seam and a second end face and the stripped middle portions together present a middle inner seam and a middle outer seam. In this arrangement, the first stripped end portions may be welded to each other by one or more seam welds along at least one of the first inner and outer seams or by an edge weld across the first end face, and the second stripped end portions may be welded to each other by one or more seam welds along at least one of the second inner and outer seams or by an edge weld across the second end face; alternatively, the stripped middle portions may be welded to each other by one or more seam welds along at least one of the middle inner and outer seams.

According to another embodiment, a method of forming a hairpin conductor includes: (i) providing two straightened wire segments each being coated with a dielectric material and having a predetermined length, respective first and second ends, and a respective middle region located between the respective first and second ends; (ii) laser-stripping a respective portion of each of the two wire segments so as to remove the dielectric material therefrom at the respective first and second ends of each wire segment to produce respective first and second laser-stripped end portions thereat and/or at the respective middle region of each wire segment to produce a laser-stripped middle portion thereat; (iii) disposing the two wire segments beside each other such that their first ends are disposed proximate each other and their second ends are disposed proximate each other; (iv) welding the first laser-stripped end portions to each other and the second laser-stripped end portions to each other and/or the laser-stripped middle portions to each other, to produce a welded wire assembly; and (v) bending the welded wire assembly while maintaining the two wire segments beside each other in a side-by-side orientation such that the two wire segments are bent equally so as to form the hairpin conductor, wherein the hairpin conductor has a primary bend in the middle regions of the two wire segments to form an apex thereat, and first and second secondary bends in the two wire segments nearer to the apex than to the first and second ends to form respective first and second shoulders thereat.

In this embodiment, the bending of the welded wire assembly may provide a first leg extending from the first shoulder to the first ends of the two wire segments and a second leg extending from the second shoulder to the second ends of the two wire segments, wherein the first and second legs are disposed parallel to each other. The welding step may be performed by laser welding, micro tungsten inert gas (TIG) welding or resistance brazing.

The method may further include: extracting a length of wire from a coil of the wire; straightening the length of wire to produce a run of straightened wire; conditioning the run of straightened wire to assure a predetermined cross-sectional profile of the straightened wire; and cutting the run of straightened wire to the predetermined length to produce the two straightened wire segments.

During the welding step, the two wire segments may be maintained in a side-by-side orientation such that the first stripped end portions together present a first inner seam, a first outer seam and a first end face, the second stripped end portions together present a second inner seam, a second outer seam and a second end face and the stripped middle portions together present a middle inner seam and a middle outer seam. In this arrangement, the first stripped end portions may be welded to each other by one or more seam welds along at least one of the first inner and outer seams or by an edge weld across the first end face, and the second stripped end portions may be welded to each other by one or more seam welds along at least one of the second inner and outer seams or by an edge weld across the second end face; alternatively, the stripped middle portions may be welded to each other by one or more seam welds along at least one of the middle inner and outer seams.

According to yet another embodiment, a hairpin conductor for use in an electric motor stator includes two electrically conductive wire segments each having respective first and second ends and a respective middle region located between the respective first and second ends, wherein the two wire segments are disposed beside each other in a side-by-side orientation such that their first ends are disposed proximate each other and their second ends are disposed proximate each other. The first ends are welded to each other and the second ends are welded to each other, and/or the middle regions are welded to each other, thereby providing a welded wire assembly. The welded wire assembly is bent such that the two wire segments are bent equally so as to form the hairpin conductor, wherein the hairpin conductor has a primary bend in the middle regions of the two wire segments to form an apex thereat and first and second secondary bends in the two wire segments nearer to the apex than to the first and second ends to form respective first and second shoulders thereat.

The hairpin conductor may further include a first leg extending from the first shoulder to the first ends of the two wire segments and a second leg extending from the second shoulder to the second ends of the two wire segments, wherein the first and second legs are disposed parallel to each other. The two wire segments may be coated with a dielectric material except for the respective first and second ends of each wire segment and/or at the respective middle region of each wire segment. The first ends together may present a first inner seam, a first outer seam and a first end face, and the second ends together may present a second inner seam, a second outer seam and a second end face. In this presentation, the hairpin conductor may further include: one or more seam welds formed along at least one of the first inner and outer seams or an edge weld across the first end face, thereby welding the first ends to each other, and one or more seam welds formed along at least one of the second inner and outer seams or an edge weld across the second end face, thereby welding the second ends to each other. Alternatively, the middle portions together may present a middle inner seam and a middle outer seam, and the hairpin conductor may further include one or more seam welds formed along at least one of the middle inner and outer seams, thereby welding the middle portions to each other.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIGS. 5-12 illustrate successive steps for forming a welded wire assembly from two wire segments.

FIGS. 15-17 illustrate successive steps for bending a welded wire assembly to form a hairpin conductor.

DETAILED DESCRIPTION

Figure 1A:
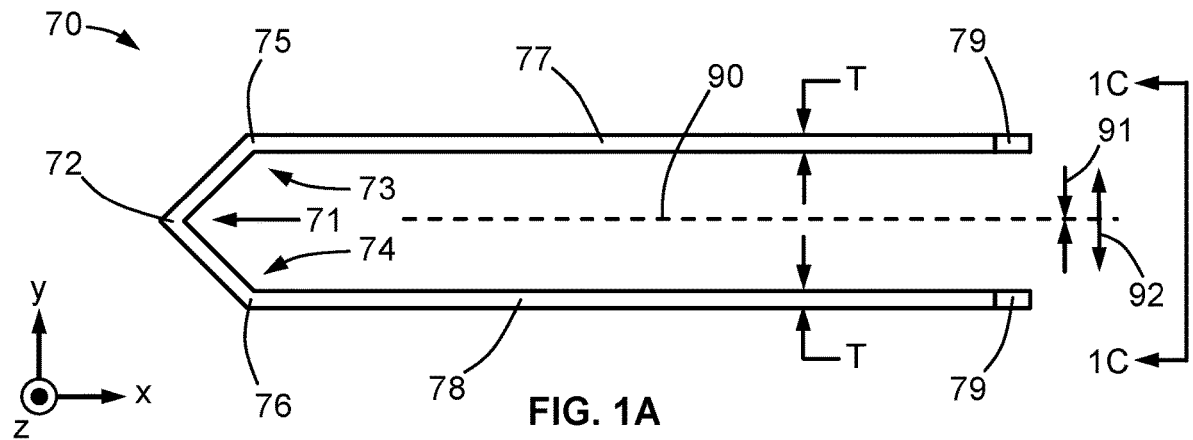
FIGS. 1A-B are schematic plan and side views, respectively, of a customary hairpin conductor.

Referring now to the drawings, wherein like numerals indicate like parts in the several views, a hairpin conductor 50 and a method 100 for making the hairpin conductor 50 are shown and described herein.

Figure 3:
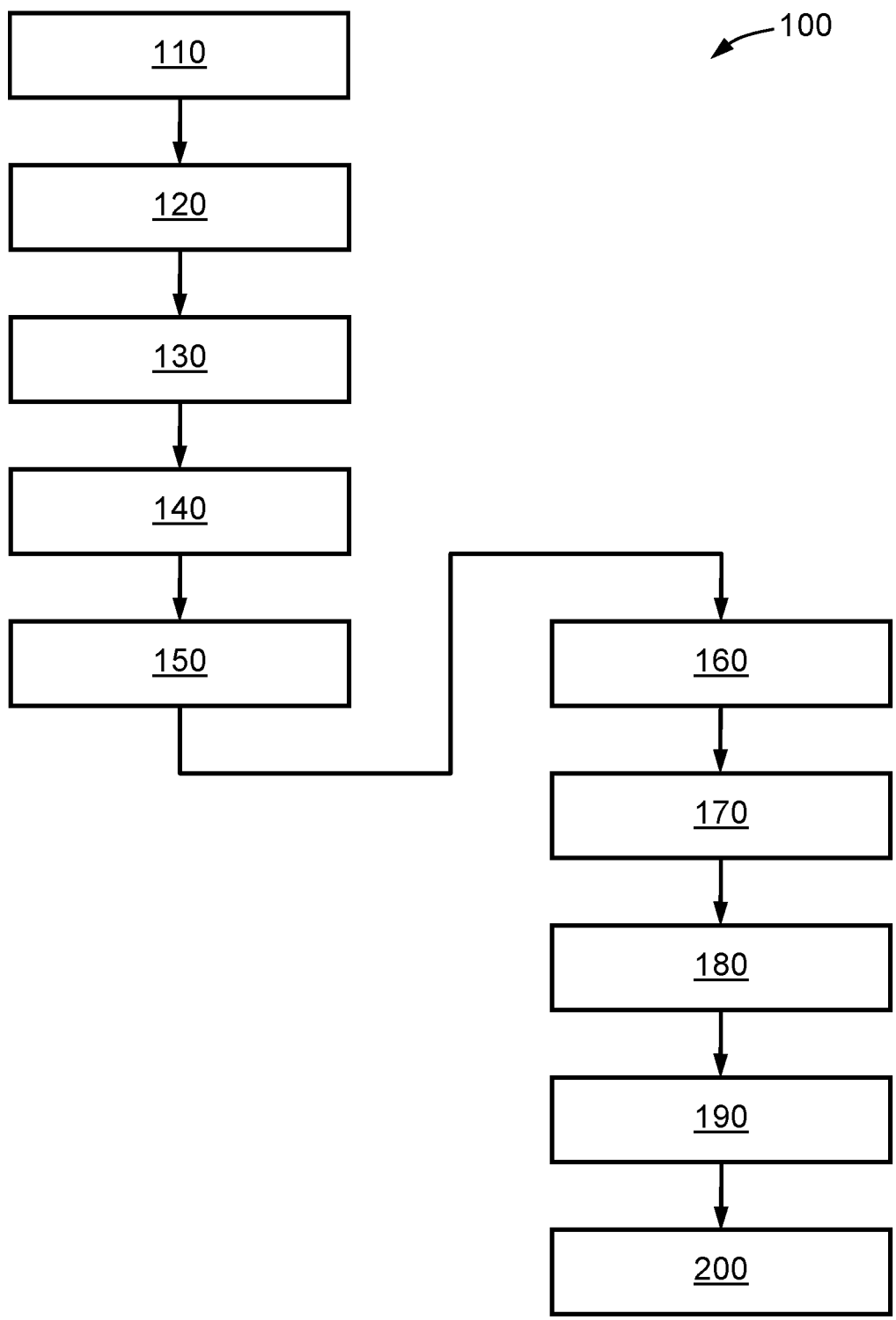
FIG. 3 is a flowchart for a method of forming a hairpin conductor.
Figure 4:
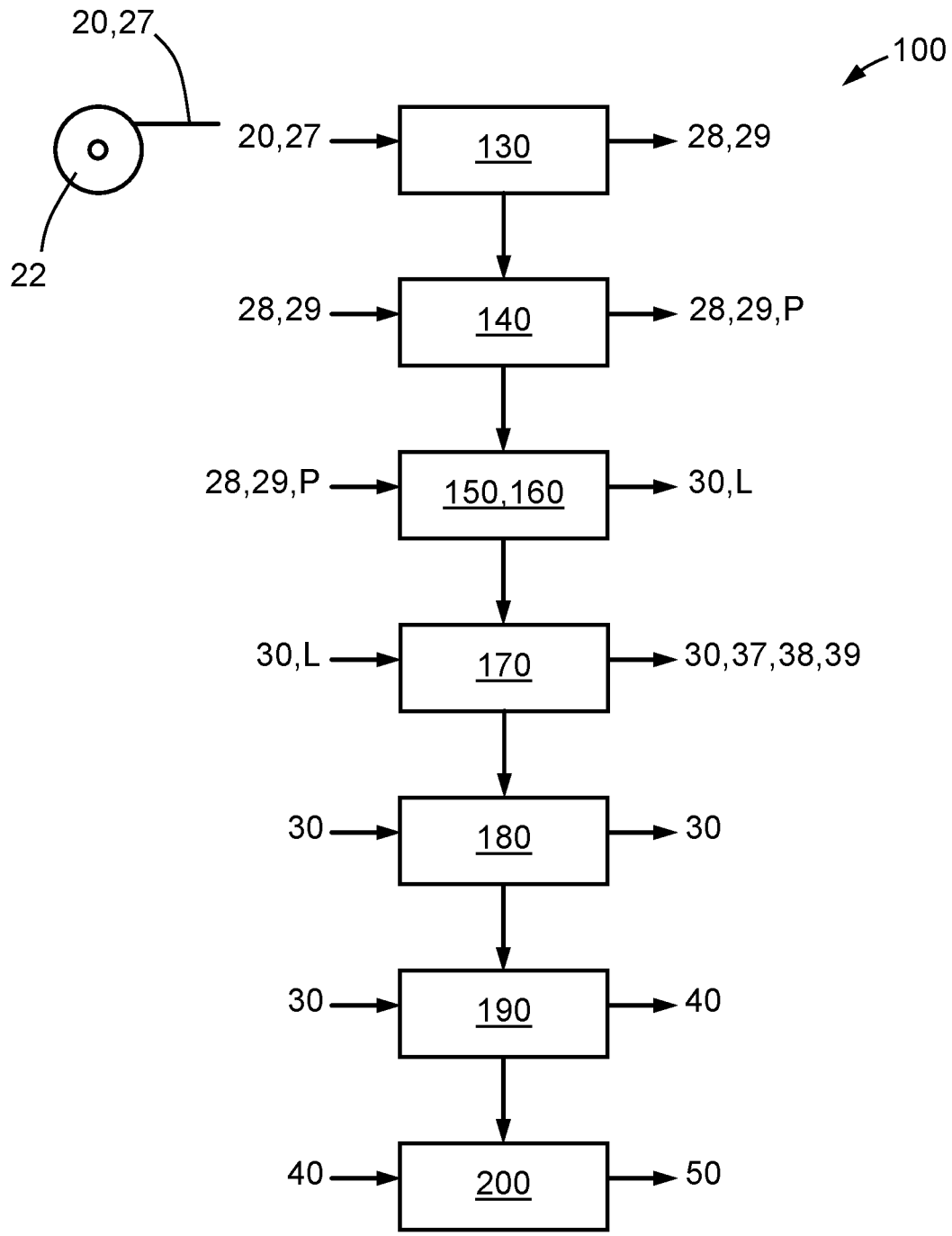
FIG. 4 is a process flow block diagram for a method of forming a hairpin conductor.

FIGS. 1A-C and 2A-C show various schematic views of a customary hairpin conductor 70 and a hairpin conductor 50 according to the present disclosure, respectively. (Note that the term "instant" may be used hereinafter to refer to the hairpin conductor 50 of the present disclosure.) Further, FIGS. 3-4 show a flowchart and a process flow block diagram, respectively, for a method 100 of forming a hairpin conductor 50, while FIGS. 5-12 show successive steps for forming a welded assembly 40 from two wire segments 30, which represents a portion of the method 100.

In FIGS. 1A-C and 2A-C, note that there are certain similarities between the customary hairpin conductor 70 and the new and improved hairpin conductor 50 of the present disclosure. For example, note that both hairpin conductors 50, 70 are made of a metallic wire having a given thickness T (as measured in the y-direction as shown in FIGS. 1A, 1C, 2A, and 2C) with the wire being bent or formed into a characteristic shape. Each hairpin conductor 50, 70 has a first leg 77, 47, a second leg 78, 48 disposed parallel to the first leg 77, 47, and a chevron-shaped portion which forms a first shoulder 75, 45 with the first leg 77, 47, a second shoulder 76, 46 with the second leg 78, 48, and an apex 72, 42 located between the first shoulder 75, 45 and the second shoulder 76, 46 and pointing away from the first and second legs 77, 47, 78, 48.

Each hairpin conductor 70, 50 has a primary bend 71, 41 in the chevron-shaped portion which forms the apex 72, 42, a first secondary bend 73, 43 which forms the first shoulder 75, 45, and a second secondary bend 74, 44 which forms the second shoulder 76, 46. As shown in FIGS. 1B-C and 2B-C, each primary bend 71, 41 is formed about a primary bending axis I and each secondary bend 73, 43, 74, 44 is formed about a respective one of two secondary bending axes II. As illustrated in FIGS. 1A, 1C, 2A and 2C, each hairpin conductor 70, 50 has a central longitudinal axis (CLA) 90 running through the apex 72, 42 and between the first and second legs 77, 78, 47, 48, with the legs 77, 78, 47, 48 being disposed parallel with the CLA 90, with an inward direction 91 being defined as a direction which faces or points toward the primary bending axis I or the CLA 90 (depending on the view taken), and an outward direction 92 being defined as a direction which faces or points away from the primary bending axis I or the CLA 90.

Additionally, the ends or tips of the first and second legs 77, 78 of the customary hairpin conductor 70 that are distal from shoulders 75, 76 may be stripped to form stripped portions 79 thereat (i.e., at the ends or tips of the first and second legs 77, 78), and similarly the ends or tips of the first and second legs 47, 48 of the instant hairpin conductor 50 that are distal from shoulders 45, 46 may be stripped to form first and second stripped end portions 37, 38 thereat (i.e., at the ends or tips of the first and second legs 47, 48). As used here, the end portions 79, 37, 38 being "stripped" means that material has been removed or stripped away from the outer surface of the metallic wire. For example, the metallic core 80, 24 of the wire may be coated or covered with a thin layer of protective dielectric material 81, 26, such as an enamel, which may be stripped away or removed from the ends, such as by a mechanical action with a wire stripper/die shearer, by ablation with a laser, etc. Alternatively, if the wire only consists of a metallic core 80, 24 with no layer of dielectric material 81, 26 covering the core 80, 24, then "stripping" the end portions 79, 37, 38 may include stripping away or removing a small amount or layer on the outer surface of the metallic core 80, 24. Note that "stripping" the end portions 79, 37, 38 may include removing material around the full outer perimeter of the wire, or it may entail removing only some of the full outer perimeter of the wire; in either case, the amount and location of the removed material should be selected so as to facilitate welding of the hairpin conductors 70, 50 to other neighboring hairpin conductors 70, 50 once these have all been inserted into the stator core.

Also note that the wire used for both the customary hairpin conductor 70 and the instant hairpin conductor 50 has a height H (as measured in the z-direction as shown in FIGS. 1B, 1C, 2B and 2C) which is larger than the thickness T (i.e., H>T). This relationship between the height H and thickness T allows the wire to be bent more easily about the primary axis I to form the primary bend 71, 41 and about the secondary bending axes II to form the secondary bends 73, 74, 43, 44. With the wire bent to form the characteristic shape shown in FIGS. 1A-C and 2A-C, and with the stripped end portions 79, 37, 38 provided as shown, the hairpin conductors 70, 50 may then be inserted into a stator core for further processing (e.g., connecting/welding individual hairpin conductors together, wave twisting, etc.) to create a completed stator for an electric motor.

Figure 1B:
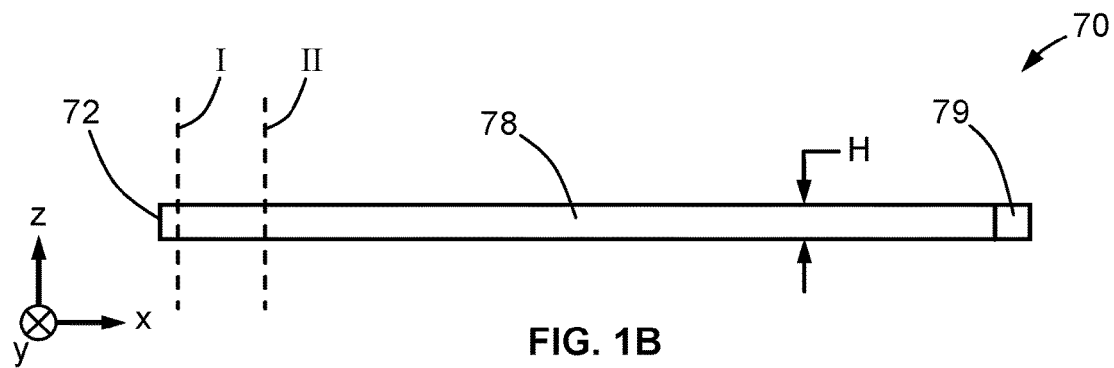
Figure 1C:
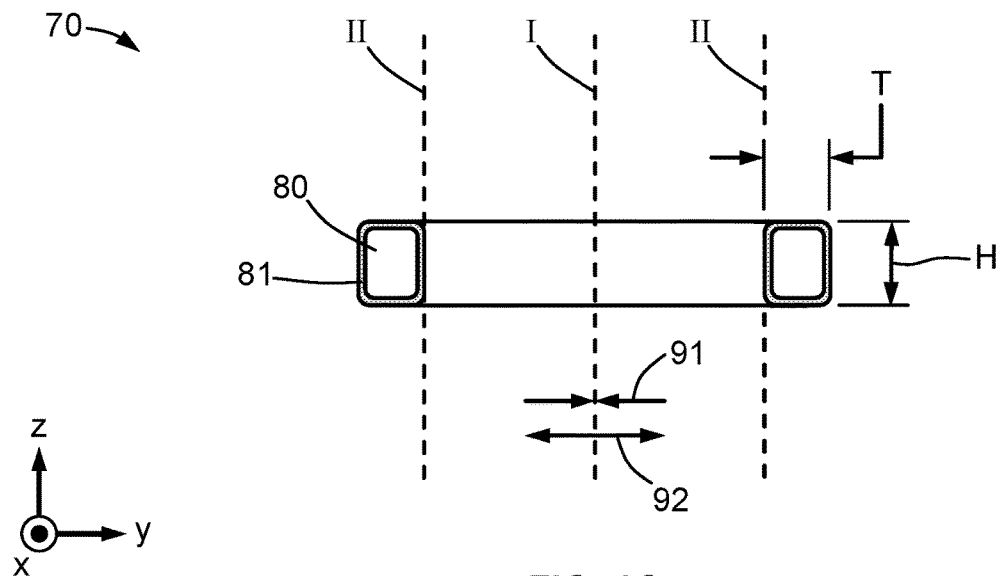
FIG. 1C is a schematic end view of the customary hairpin conductor of FIG. 1A along line 1C-1C.

However, while there are certain similarities between customary hairpin conductors 70 and the instant hairpin conductor 50, there are also significant differences between them. For example, while each customary hairpin conductor 70 may be constructed from a single wire segment having a cross-section with the abovementioned height H and thickness T, the instant hairpin conductor 50 is formed by two separate wire segments that have been sandwiched together (one on top of the other) and welded together. This is apparent from comparing FIGS. 1B-C with FIGS. 2B-C. In FIGS. 1B-C, it can be seen that the height H of the customary hairpin conductor 70 is provided by a single wire segment; but in contrast, in FIGS. 2B-C it can be seen that the height H of the instant hairpin conductor 50 is provided by two wire segments 30 which have been stacked and welded together. Thus, the instant hairpin conductor 50 utilizes two wire segments that are each about half as high in height H than would be the case for the single wire segment used in the customary hairpin conductor 70.

This "stacked" design of the instant hairpin conductor 50 helps to reduce stresses along the bends of the wire segments 30 (i.e., at the primary and secondary bends 41, 43, 44), and enables faster and higher quality stator assembly processes.

Another difference between the customary hairpin conductor 70 and the instant hairpin conductor 50 is that each of the two wire segments 30 of the instant hairpin conductor 50 has a middle region 33 (located between the first and second ends 31, 32) which may also be stripped and welded together, in addition to or instead of the end portions 37, 38 being stripped and welded together, as illustrated in FIGS. 14G-I and 15-17 (as discussed in more detail below).

Figure 2A:
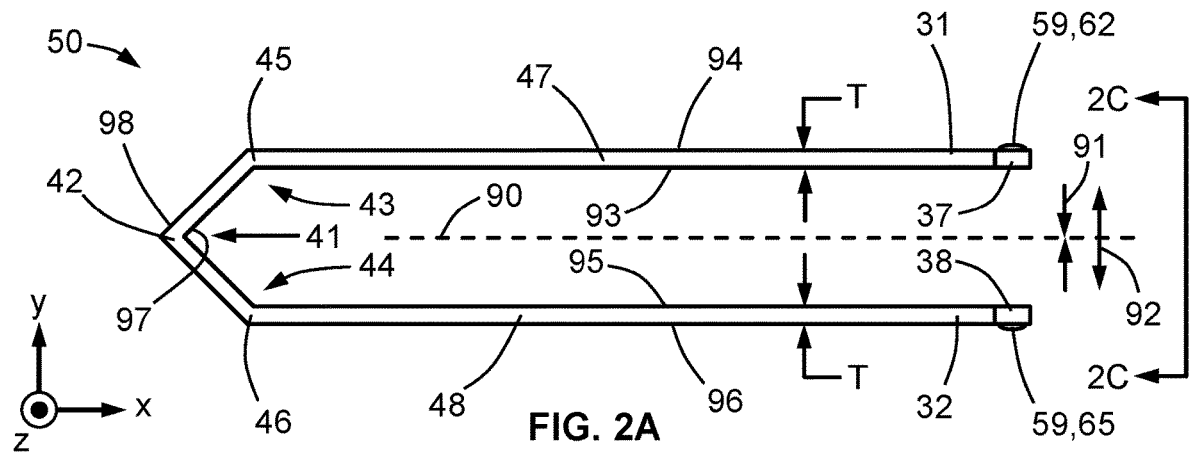
FIGS. 2A-B are schematic plan and side views, respectively, of a hairpin conductor according to the present disclosure.
Figure 2B:
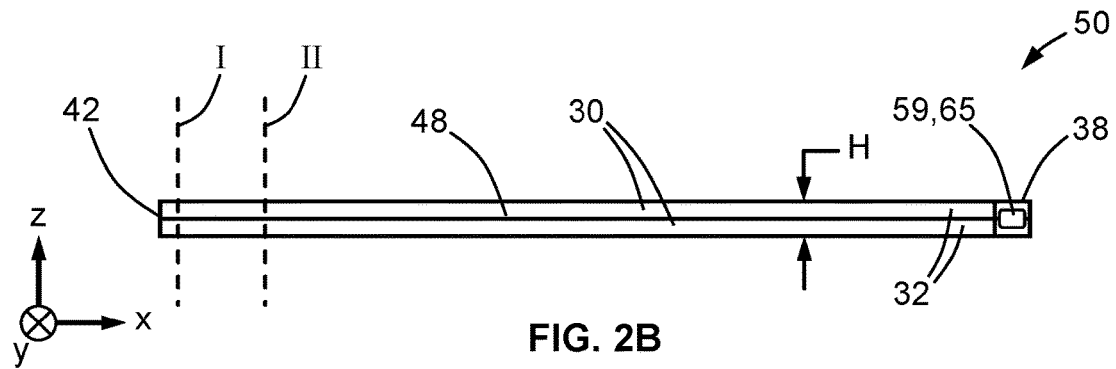

As shown in FIG. 2A, the instant hairpin conductor 50 has a central longitudinal axis (CLA) 90 running through the apex 42 and between the first and second legs 47, 48, with the legs 47, 48 being parallel with the CLA 90. An inner side 93 of the first leg 47 faces toward the CLA 90 while an outer side 94 of the first leg 47 faces away from the CLA 90. Similarly, an inner side 95 of the second leg 48 faces toward the CLA 90 while an outer side 96 of the second leg 48 faces away from the CLA 90. And as shown in the cross-sectional views of FIGS. 14G and 15, an inner side 97 of the middle region 33 faces toward the primary bending axis I while an outer side 98 of the middle region 33 faces away from the primary bending axis I.

Turning now to FIGS. 3-17, a method and process flow 100 for forming the instant hairpin conductor 50 will be described. As noted above, FIGS. 3-4 show a flowchart and a process flow block diagram, respectively, for the method 100, while FIGS. 5-12 show successive steps for forming a welded wire assembly 40 from two wire segments 30, which represents a portion of the method 100. Note that in FIG. 4 the inputs are shown to the left of each block or step, and the results or outputs are shown to the right of each block or step.

According to one embodiment, the method 100 includes, at block 160 (and as illustrated in FIG. 5), providing two straightened wire segments 30 each having a predetermined length L, respective first and second ends 31, 32, and a respective middle region 33 located between the respective first and second ends 31, 32. Note that the middle region 33 of each wire segment 30 may encompass the midpoint 34 which lies between the two ends 31, 32 plus some portion of the midpoint 34 immediately adjacent the midpoint 34.

Next, at block 170, a respective selected portion or part 35 of each of the two wire segments 30 is stripped to produce a respective stripped portion 36 thereat (i.e., at the respective selected portion or part 35 of each of the two wire segments 30). In other words, some portion 35 of each wire segment 30 (i.e., one or more locations on each wire segment 30) is identified as being where stripping of the wire segment 30 is desired or called for, and that portion 35 (i.e., the one or more locations) is/are stripped, thereby producing the stripped portion 36. For example, FIG. 5 shows that the desired/selected portion 35 of each wire segment 30 includes the first and second ends 31, 32, and FIG. 6 shows that these selected portions 35 have been stripped to produce the first and second stripped end portions 37, 38 on each wire segment 30. Alternatively, the middle region 33 of each wire segment 30 may be identified as the selected portion 35, and after stripping these portions 35 or locations, a stripped middle portion 39 is produced thereat on each wire segment 30 (i.e., at the selected portions 35 or locations), as illustrated in FIG. 7.

At block 180, the two wire segments 30 are disposed or "stacked" beside or on top of each other such that their first ends 31 are disposed proximate each other and their second ends 32 are disposed proximate each other. Note that FIG. 8 illustrates two stacked wire segments 30 where stripped portions 36 have been formed at the first and second ends 31, 32 (thus forming first and second stripped end portions 37, 38 at the first and second ends 31, 32), while FIG. 9 illustrates two stacked wire segments 30 where stripped portions 36 have been formed at the middle regions 33 (thus forming stripped middle portions 39 at the middle regions 33).

At block 190, the two first stripped end portions 37 may be welded to each other and the two second stripped end portions 38 may be welded to each other to produce a welded wire assembly 40, as illustrated in FIGS. 10-11. Note that the welded wire assemblies 40 of FIGS. 10-11 differ from each other in the way the end portions 37, 38 are welded together. Specifically, in FIG. 10 one or more seam welds 59 are used at each end portion 37, 38, while in FIG. 11 an edge weld 60 is used at each end portion 37, 38. Alternatively, the stripped middle portions 39 may be welded to each other to produce a welded wire assembly 40, as illustrated in FIG. 12. Here, one or more seam welds 59 are used to weld the middle portions 39 to each other. (The specific configurations of seam welds 59 and/or edge welds 60 used will be discussed in more detail below in connection with FIGS. 14A-Q.)

Finally, at block 200, the welded wire assembly 40 is bent while maintaining the two wire segments 30 beside each other (in the side-by-side or "stacked" orientation 49) to form the hairpin conductor 50. An exemplary bending process is illustrated in FIGS. 15-17. In FIG. 15, a welded wire assembly 40 (shown in solid lines) is bent at the middle regions 33 around a primary dowel or mandrel 41' (serving as a primary bending axis I) to form a partially bent welded wire assembly 40 (shown in dotted lines) having a primary bend 41 and an apex 42. Then in FIG. 16, the partially bent welded wire assembly 40 is further bent around two secondary dowels/mandrels 43', 44' (serving as secondary bending axes II) to form a completed hairpin conductor 50 having first and second secondary bends 43, 44 and first and second shoulders 45, 46 at points along the two wire segments 30 that are nearer to the apex 42 than to the first and second ends 31, 32. Note that while the drawings may show the apex 42, shoulders 45, 46 and primary/secondary bends 41, 43, 44 having sharp or abrupt corners and bends, this is only due to the schematic nature of the drawings; in actual manufacturing practice, these features may instead be somewhat rounded or filleted rather than abrupt. (It may also be noted that because of the schematic nature of the drawings, the various elements illustrated might not necessarily be to scale with one another.)

The stripping step (block 170) may be performed by laser-stripping (e.g., laser ablation) and/or by mechanical action (e.g., die shearing/wire stripping), and the welding step (block 190) may be performed by laser welding, micro tungsten inert gas (TIG) welding or resistance brazing. The bending of the welded wire assembly 40 (block 200) provides a first leg 47 extending from the first shoulder 45 to the first ends 31 of the two wire segments 30 and a second leg 48 extending from the second shoulder 46 to the second ends 38 of the two wire segments 30, wherein the first and second legs 47, 48 are disposed parallel to each other.

The method 100 may also include (at block 110) providing a coil 22 of wire 20, and (at block 120) extracting or unwinding a length or payout 27 of wire 20 from the coil 22. Note that the length 27 of wire 20 may be enough to produce anywhere from one hairpin conductor 50 to a large number (e.g., hundreds, thousands, etc.) of the hairpin conductors 50. This length or payout 27 of wire 20 may be a discrete length or amount (e.g., enough to produce a defined number of hairpin conductors 50), or it may be a continuous feed or payout of wire 20.

The method 100 may further include (at block 130) straightening the length 27 of wire 20 extracted from the coil 22 to produce a run 28 of straightened wire 29. This straightening may be accomplished by passing the wire 20 through or across one or more straightening dies which may include rollers, slides, etc. Additionally, the method 100 may include (at block 140) conditioning the run 28 of straightened wire 29 to produce or assure a predetermined cross-sectional profile P of the straightened wire, as well as (at block 150) cutting the run 28 of straightened wire 29 to the predetermined length L to produce two (or any other number of) straightened wire segments 30. The predetermined cross-sectional profile P may be a desired shape and/or a set of dimensions that the cross-section of the wire 20 should have or achieve, such as the rounded rectangular shape shown in FIGS. 2C and 14A-Q. The conditioning may be accomplished by passing or pulling the wire 20 through a die or device that is configured to check the cross-sectional shape and/or dimensions of the wire 20, and/or to affect and shape the cross-sectional profile of the wire 20 to make sure it conforms with the predetermined cross-sectional profile P.

As noted earlier, the two wire segments 30 have a metallic core 80 and may be coated with a dielectric material 81, and the stripping step (at block 170) may remove the dielectric material 81 from the selected or targeted portions 35 of the two wire segments 30 to produce the desired stripped portions 36 (which may be located at the first and second ends 31, 32 and/or at the middle regions 33). During the bending step (at block 200), the two wire segments 30 may be maintained in a side-by-side (or one-atop-the-other or "stacked") orientation 49 such that the two wire segments 30 are bent equally when the welded wire assembly 40 is bent around the primary and secondary bending axes I, II.

Figure 2C:
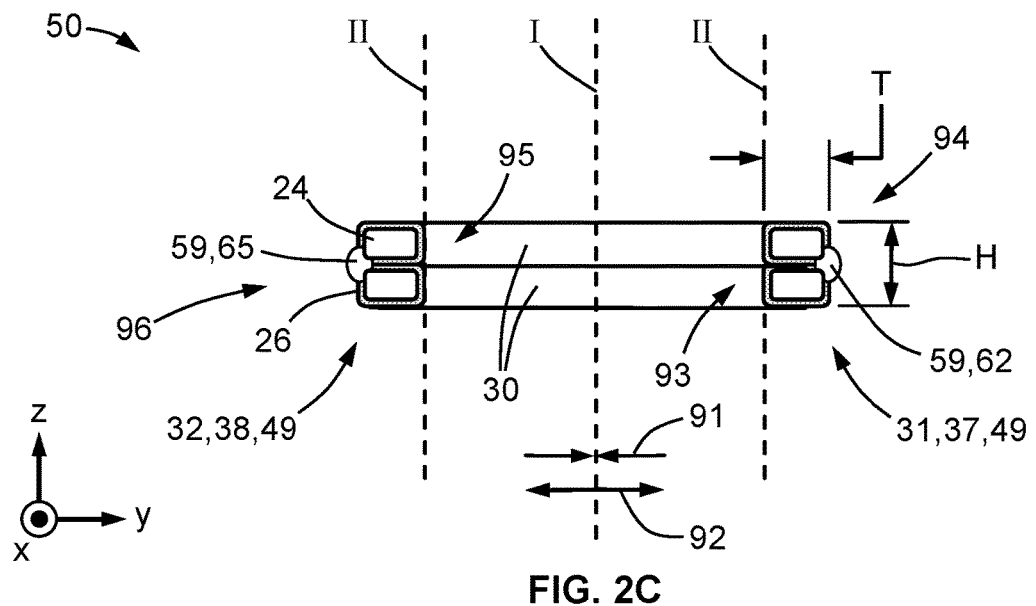
FIG. 2C is a schematic end view of the hairpin conductor of FIG. 2A along line 2C-2C.

For example, as illustrated in FIG. 2C, the two segments 30 appear to be "stacked" one on top of the other in the "vertical" or z-direction, and the primary and secondary bending axes I, II run parallel to this z-direction. In this side-by-side or "stacked" orientation 49, when the welded wire assembly 40 is bent about the primary and secondary bending axes I, II, both of the two wire segments 30 will experience essentially the same bending force and/or bending moment. Also, if the wire segments 30 are coated with a dielectric material 81, then the layers of dielectric material 81 on the two wire segments 30 may directly touch each other, but the metallic cores 80 of the two wire segments 30 will not directly touch each other (at least along the wires segments' unstripped lengths).

Figure 13:
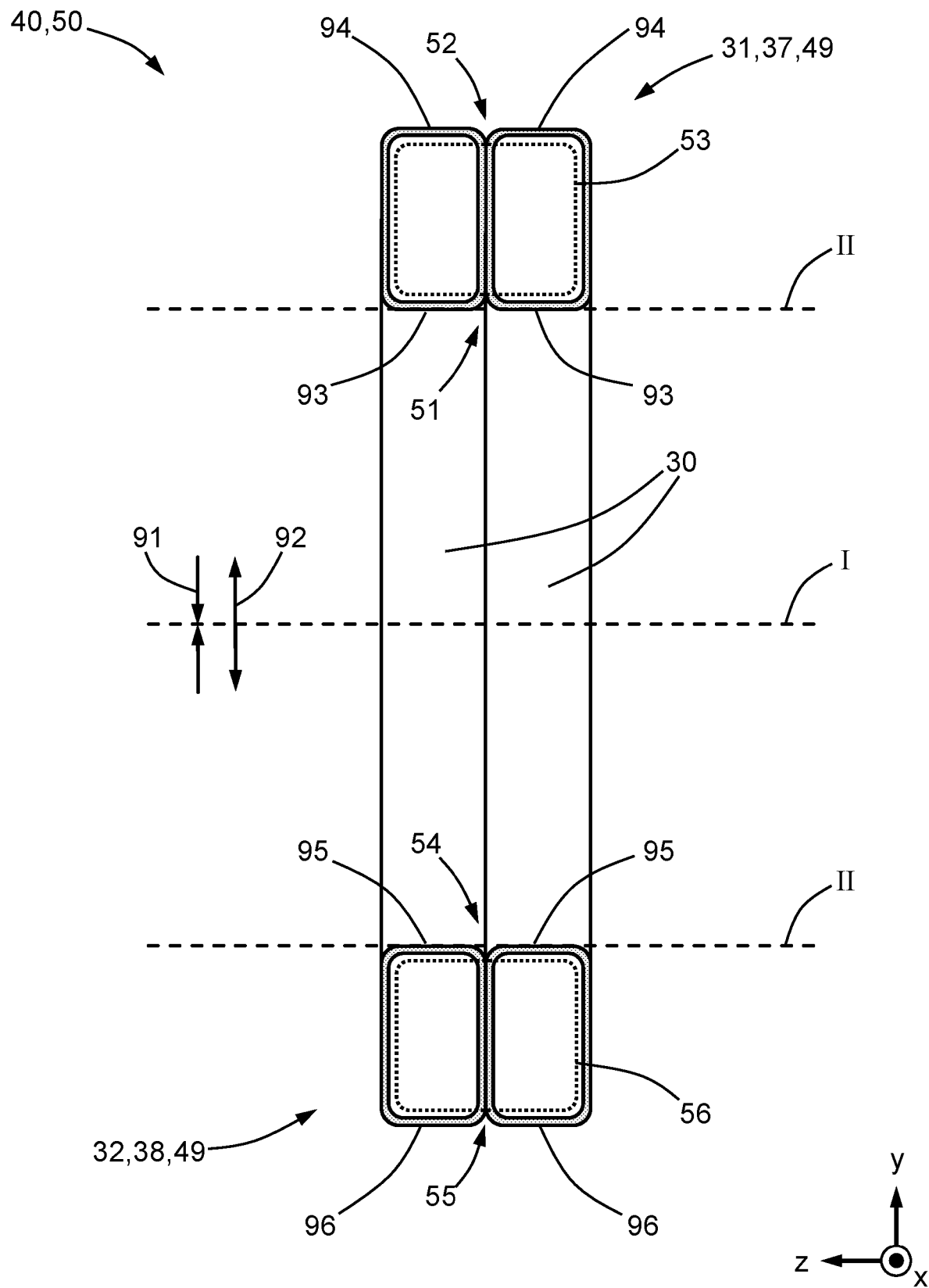
FIG. 13 is a schematic end view of a bent welded wire assembly or hairpin conductor, but without any welds shown.

Note that once the two wire segments 30 are brought together in the aforementioned side-by-side or "stacked" orientation 49 (at block 180) as shown in FIGS. 8-9, the two wire segments 30 may be maintained in this orientation 49 during the welding step (at block 190) as shown in FIGS. 10-12. In this orientation 49, inner and outer seams are created between the wire segments 30 which run along the full predetermined lengths L of the wire segments 30, and an end face is presented at each of the two ends 31, 32. These seams and end faces are illustrated in FIG. 13, which shows a schematic end view of a bent welded wire assembly 40 or hairpin conductor 50, but without any welds shown so that all of the seams and end faces may be seen. In the side-by-side or "stacked" orientation 49 shown, the first stripped end portions 37 together present a first inner seam 51, a first outer seam 52 and a first end face 53, the second stripped end portions 38 together present a second inner seam 54, a second outer seam 55 and a second end face 56, and the stripped middle portions 39 together present a middle inner seam 57 and a middle outer seam 58. Note that the "inner" seams (i.e., the first and second inner seams 51, 54) face in the inward direction 91 toward the primary bending axis I, whereas the "outer" seams (i.e., the first and second outer seams 52, 55) face in the outward direction 92 away from the primary bending axis I. Thus, the "inner" and "outer" designations for the seams are determined by the direction in which the welded wire assembly 40 is bent (or to be bent) about the primary bending axis I.

In this arrangement, the first stripped end portions 37 may be welded to each other by one or more seam welds 59 along at least one of the first inner and outer seams 51, 52 or by an edge weld 60 across the first end face 53, and the second stripped end portions 38 may be welded to each other by one or more seam welds 59 along at least one of the second inner and outer seams 54, 55 or by an edge weld 60 across the second end face 56, as illustrated in FIGS. 10-11. Alternatively, the stripped middle portions 39 may be welded to each other by one or more seam welds 59 along at least one of the middle inner and outer seams 57, 58, as shown in FIG. 12.

Figure 14A:
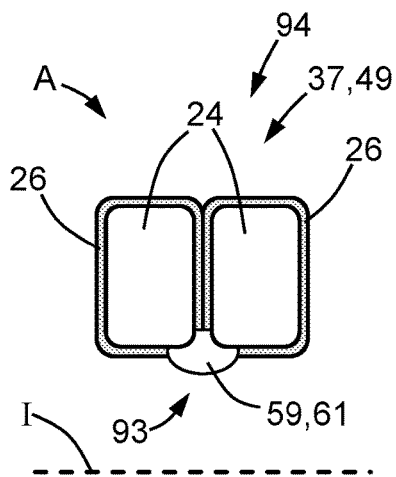
FIGS. 14A-C show schematic end views of a first end of the welded wire assembly of FIG. 10 along line W-W.
Figure 14B:
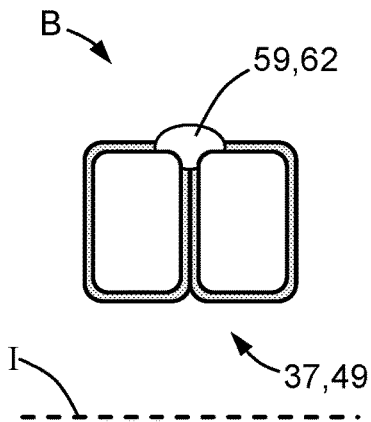
Figure 14C:
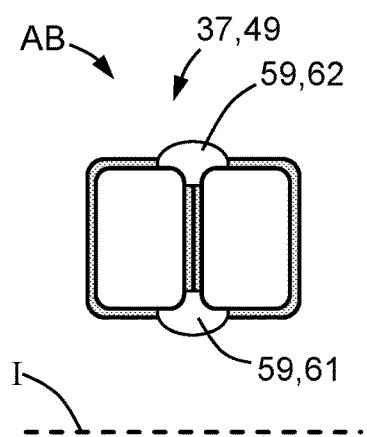
Figure 14D:
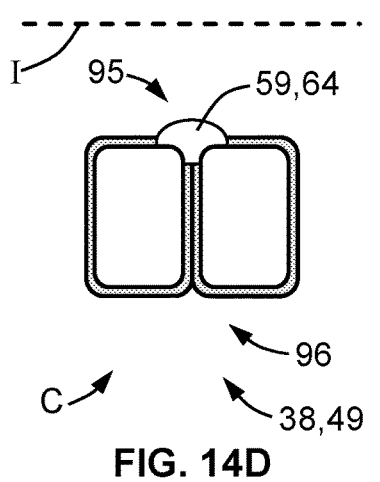
FIGS. 14D-F show schematic end views of a second end of the welded wire assembly of FIG. 10 along line V-V.
Figure 14E:
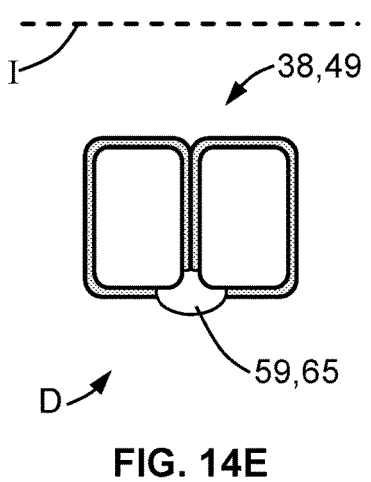
Figure 14F:
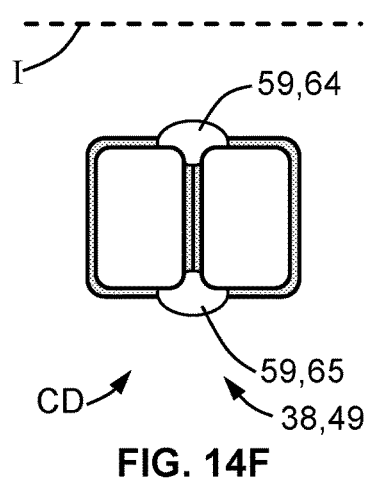
Figure 14G:
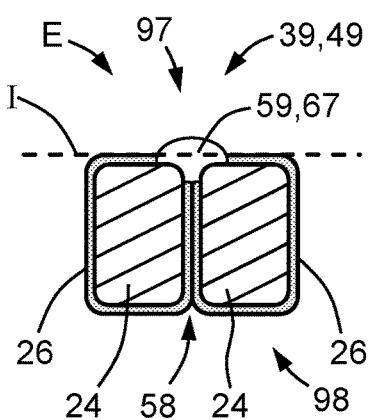
FIGS. 14G-I show schematic cross-sectional views of the welded wire assembly of FIG. 12 along line Z-Z.
Figure 14H:
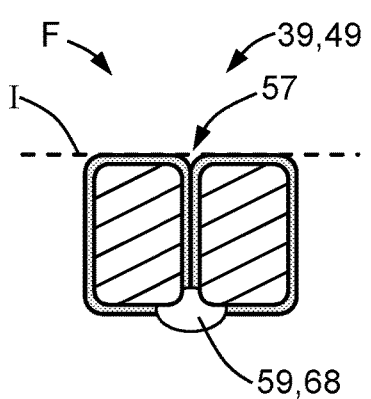
Figure 14I:
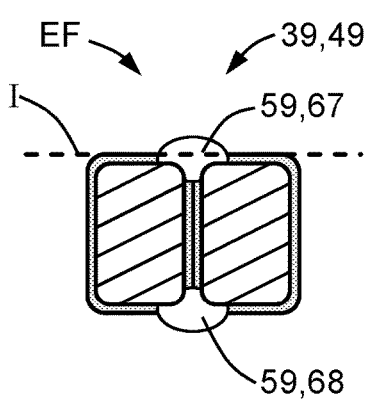
Figure 14J:
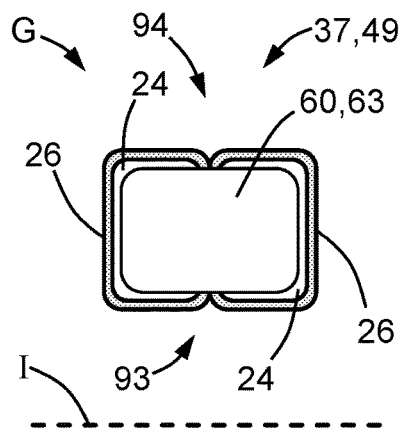
FIG. 14J shows a schematic end view of a first end of the welded wire assembly of FIG. 11 along line Y-Y.
Figure 14K:
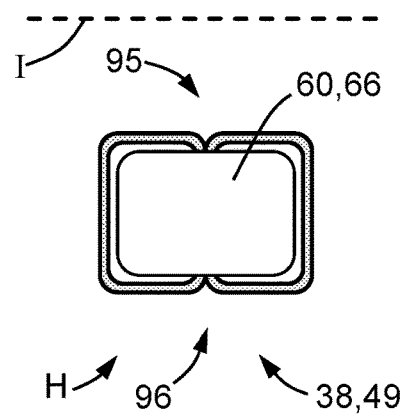
FIG. 14K shows a schematic end view of a second end of the welded wire assembly of FIG. 11 along line X-X.
Figure 14L:
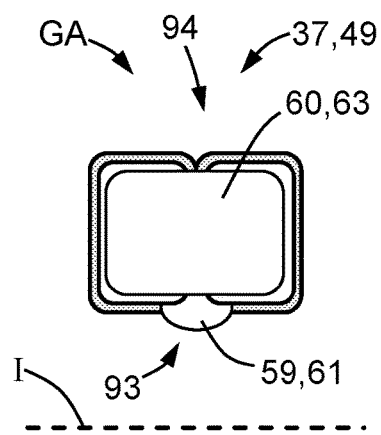
FIGS. 14L-N show schematic end views of a first end of a welded wire assembly using one or more seams welds and an edge weld.
Figure 14M:
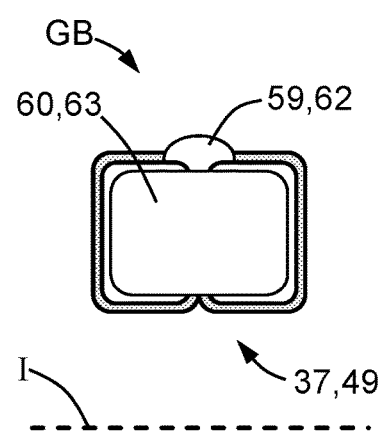
Figure 14N:
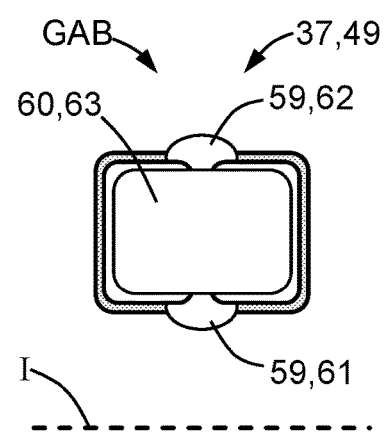
Figure 14O:
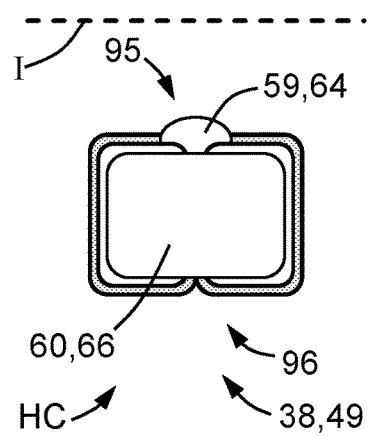
FIGS. 14O-Q show schematic end views of a second end of a welded wire assembly using one or more seams welds and an edge weld.
Figure 14P:
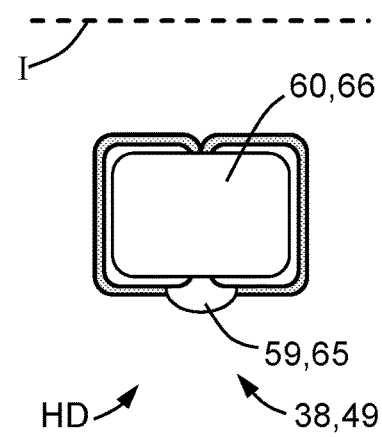
Figure 14Q:
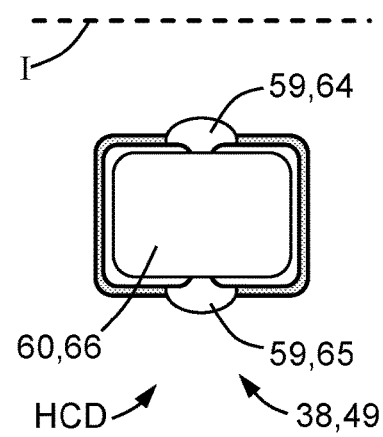

The various combinations of seam welds 59 and edge welds 60 are illustrated in FIGS. 14A-Q. Note that FIGS. 14A-C show combinations of seam welds 59 with respect to the first stripped end portions 37, FIGS. 14D-F show combinations of seam welds 59 with respect to the second stripped end portions 38, FIGS. 14G-I show combinations of seam welds 59 with respect to the stripped middle portions 39, FIGS. 14J-K show edge welds 60 with respect to the first and second end faces 53, 56, FIGS. 14L-N show combinations of seam welds 59 and edge welds 60 with respect to the first stripped end portions 37, and FIGS. 14O-Q show combinations of seam welds 59 and edge welds 60 with respect to the second stripped end portions 38. These welds 59, 60 include a first inner seam weld 61 (FIGS. 14A, 14C, 14L, 14N), a first outer seam weld 62 (FIGS. 14B, 14C, 14M, 14N), a first edge weld 63 (FIGS. 14J, 14L, 14M, 14N), a second inner seam weld 64 (FIGS. 14D, 14F, 14O, 14Q), a second outer seam weld 65 (FIGS. 14E, 14F, 14P, 14Q), a second edge weld 66 (FIGS. 14K, 14, O, 14P, 14Q), a middle inner seam weld 67 (FIGS. 14G, 14I) and a middle outer seam weld 68 (FIGS. 14H, 14I). Note that the seam welds 59 may include one or two (or more) seam welds 59, and the edge welds 60 may include one (or more) edge welds 60. Also note that the seam welds 59 and edge welds 60 may optionally be used in combination with each other. These combinations are identified by one or more alphabetic reference numerals in each drawing of FIGS. 14A-Q, as summarized in TABLE 1 below:

TABLE 1

Combinations of Weld Types Utilized in the Drawings

| FIG. | Combination | Weld Types Utilized |
|---|---|---|
| 14A | A | first inner seam weld 61 |
| 14B | B | first outer seam weld 62 |
| 14C | AB | first inner and outer seam welds 61, 62 |

TABLE 1-continued

Combinations of Weld Types Utilized in the Drawings

| FIG. | Combination | Weld Types Utilized |
|---|---|---|
| 14D | C | second inner seam weld 64 |
| 14E | D | second outer seam weld 65 |
| 14F | CD | second inner and outer seam welds 64, 65 |
| 14G | E | middle inner seam weld 67 |
| 14H | F | middle outer seam weld 68 |
| 14I | EF | middle inner and outer seam welds 67, 68 |
| 14J | G | first edge weld 63 |
| 14K | H | second edge weld 66 |
| 14L | GA | first edge weld 63 and first inner seam weld 61 |
| 14M | GB | first edge weld 63 and first outer seam weld 62 |
| 14N | GAB | first edge weld 63 and first inner and outer seam welds 61, 62 |
| 14O | HC | second edge weld 66 and second inner seam weld 64 |
| 14P | HD | second edge weld 66 and second outer seam weld 65 |
| 14Q | HCD | second edge weld 66 and second inner and outer seam welds 64, 65 |

It may be noted that while FIGS. 3-4 and the description above characterize the process steps of the method 100 as occurring in a particular order, the steps may also be executed in a different order. For example, the stripping step of block 170 may occur after the disposing step of block 180, etc.

According to another embodiment, a method 100 of forming a hairpin conductor 50 includes: (i) providing two straightened wire segments 30 each being coated with a dielectric material 81 and having a predetermined length L, respective first and second ends 31, 32, and a respective middle region 33 located between the respective first and second ends 31, 32; (ii) laser-stripping a respective portion of each of the two wire segments 30 so as to remove the dielectric material 81 therefrom at the respective first and second ends 31, 32 of each wire segment 30 to produce respective first and second laser-stripped end portions 37, 38 thereat, and/or at the respective middle region 33 of each wire segment 30 to produce a laser-stripped middle portion 39 thereat; (iii) disposing the two wire segments 30 beside each other such that their first ends 31 are disposed proximate each other and their second ends 32 are disposed proximate each other; (iv) welding the first laser-stripped end portions 37 to each other and the second laser-stripped end portions 38 to each other, and/or the laser-stripped middle portions 39 to each other, to produce a welded wire assembly 40; and (v) bending the welded wire assembly 40 while maintaining the two wire segments 30 beside each other in a side-by-side orientation 49 such that the two wire segments 30 are bent equally so as to form the hairpin conductor 50, wherein the hairpin conductor 50 has a primary bend 41 in the middle regions 33 of the two wire segments 30 to form an apex 42 thereat, and first and second secondary bends 43, 44 in the two wire segments 30 nearer to the apex 42 than to the first and second ends 31, 32 to form respective first and second shoulders 45, 46 thereat.

In this embodiment, the bending of the welded wire assembly 40 may provide a first leg 47 extending from the first shoulder 45 to the first ends 31 of the two wire segments 30 and a second leg 48 extending from the second shoulder 46 to the second ends 32 of the two wire segments 30, wherein the first and second legs 47, 48 are disposed parallel to each other. The welding step may be performed by laser welding, micro tungsten inert gas (TIG) welding or resistance brazing.

The method 100 may further include: extracting a length 27 of wire 20 from a coil 22 of the wire 20; straightening the length 27 of wire 20 to produce a run 28 of straightened wire 29; conditioning the run 28 of straightened wire 29 to assure a predetermined cross-sectional profile P of the straightened wire 29; and cutting the run 28 of straightened wire 29 to the predetermined length L to produce the two straightened wire segments 30.

During the welding step, the two wire segments 30 may be maintained in a side-by-side orientation 49 such that the first stripped end portions 37 together present a first inner seam 51, a first outer seam 52 and a first end face 53, the second stripped end portions 38 together present a second inner seam 54, a second outer seam 55 and a second end face 56 and the stripped middle portions 39 together present a middle inner seam 57 and a middle outer seam 58. In this arrangement, the first stripped end portions 37 may be welded to each other by one or more seam welds 59 along at least one of the first inner and outer seams 51, 52 or by an edge weld 60 across the first end face 53, and the second stripped end portions 38 may be welded to each other by one or more seam welds 59 along at least one of the second inner and outer seams 54, 55 or by an edge weld 60 across the second end face 56; alternatively, the stripped middle portions 39 may be welded to each other by one or more seam welds 59 along at least one of the middle inner and outer seams 57, 58.

According to yet another embodiment, a hairpin conductor 50 for use in an electric motor stator includes two electrically conductive wire segments 30 each having respective first and second ends 31, 32 and a respective middle region 33 located between the respective first and second ends 31, 32, wherein the two wire segments 30 are disposed beside each other in a side-by-side orientation 49 such that their first ends 31 are disposed proximate each other and their second ends 32 are disposed proximate each other. The first ends 31 are welded to each other and the second ends 32 are welded to each other, and/or the middle regions 33 are welded to each other, thereby providing a welded wire assembly 40. The welded wire assembly 40 is bent such that the two wire segments 30 are bent equally so as to form the hairpin conductor 50, wherein the hairpin conductor 50 has a primary bend 41 in the middle regions 33 of the two wire segments 30 to form an apex 42 thereat and first and second secondary bends 43, 44 in the two wire segments 30 nearer to the apex 42 than to the first and second ends 31, 32 to form respective first and second shoulders 45, 46 thereat.

The hairpin conductor 50 may further include a first leg 47 extending from the first shoulder 45 to the first ends 31 of the two wire segments 30 and a second leg 48 extending from the second shoulder 46 to the second ends 32 of the two wire segments 30, wherein the first and second legs 47, 48 are disposed parallel to each other. The two wire segments 30 may be coated with a dielectric material 81 except for the respective first and second ends 31, 32 of each wire segment 30 and/or at the respective middle region 33 of each wire segment 30. The first ends 31 together may present a first inner seam 51, a first outer seam 52 and a first end face 53, and the second ends 32 together may present a second inner seam 54, a second outer seam 55 and a second end face 56. In this presentation, the hairpin conductor 50 may further include: one or more seam welds 59 formed along at least one of the first inner and outer seams 51, 52 or an edge weld 60 across the first end face 53, thereby welding the first ends 32 to each other, and one or more seam welds 59 formed along at least one of the second inner and outer seams 54, 55 or an edge weld 60 across the second end face 56, thereby welding the second ends 38 to each other. Alternatively, the middle portions 33 together may present a middle inner seam 57 and a middle outer seam 58, and the hairpin conductor 50 may further include one or more seam welds 59 formed along at least one of the middle inner and outer seams 57, 58, thereby welding the middle portions 33 to each other.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of forming a hairpin conductor, comprising:
providing two straightened wire segments each having a predetermined length, respective first and second ends, and a respective middle region located between the respective first and second ends;
stripping a respective portion of each of the two wire segments at the respective first and second ends of each wire segment to produce respective first and second stripped end portions thereat and/or at the respective middle region of each wire segment to produce a stripped middle portion thereat;
disposing the two wire segments beside each other such that their first ends are disposed proximate each other and their second ends are disposed proximate each other;
welding the first stripped end portions to each other and the second stripped end portions to each other and/or the stripped middle portions to each other, to produce a welded wire assembly; and
bending the welded wire assembly while maintaining the two wire segments beside each other to form the hairpin conductor, wherein the hairpin conductor has a primary bend in the middle regions of the two wire segments to form an apex thereat, and first and second secondary bends in the two wire segments nearer to the apex than to the first and second ends to form respective first and second shoulders thereat.

2. The method of claim 1, wherein the bending of the welded wire assembly provides a first leg extending from the first shoulder to the first ends of the two wire segments and a second leg extending from the second shoulder to the second ends of the two wire segments, wherein the first and second legs are disposed parallel to each other.

3. The method of claim 1, wherein the stripping step is performed by at least one of laser-stripping and mechanical action.

4. The method of claim 1, wherein the welding step is performed by laser welding, micro tungsten inert gas (TIG) welding or resistance brazing.

5. The method of claim 1, further comprising:
extracting a length of wire from a coil of the wire; and
straightening the length of wire to produce a run of straightened wire.

6. The method of claim 5, further comprising:
conditioning the run of straightened wire to assure a predetermined cross-sectional profile of the straightened wire.

7. The method of claim 6, further comprising:
cutting the run of straightened wire to the predetermined length to produce the two straightened wire segments.

8. The method of claim 1, wherein the two wire segments are coated with a dielectric material, and wherein the stripping step removes the dielectric material from the stripped portions of the two wire segments.

9. The method of claim 1, wherein, during the bending step, the two wire segments are maintained in a side-by-side orientation such that the two wire segments are bent equally.

10. The method of claim 1, wherein, during the welding step, the two wire segments are maintained in a side-by-side orientation such that the first stripped end portions together present a first inner seam, a first outer seam and a first end face, the second stripped end portions together present a second inner seam, a second outer seam and a second end face and the stripped middle portions together present a middle inner seam and a middle outer seam, and
wherein the first stripped end portions are welded to each other by one or more seam welds along at least one of the first inner and outer seams or by an edge weld across the first end face and the second stripped end portions are welded to each other by one or more seam welds along at least one of the second inner and outer seams or by an edge weld across the second end face, or the stripped middle portions are welded to each other by one or more seam welds along at least one of the middle inner and outer seams.

11. A method of forming a hairpin conductor, comprising:
providing two straightened wire segments each being coated with a dielectric material and having a predetermined length, respective first and second ends, and a respective middle region located between the respective first and second ends;
laser-stripping a respective portion of each of the two wire segments so as to remove the dielectric material therefrom at the respective first and second ends of each wire segment to produce respective first and second laser-stripped end portions thereat and/or at the respective middle region of each wire segment to produce a laser-stripped middle portion thereat;
disposing the two wire segments beside each other such that their first ends are disposed proximate each other and their second ends are disposed proximate each other;
welding the first laser-stripped end portions to each other and the second laser-stripped end portions to each other and/or the laser-stripped middle portions to each other, to produce a welded wire assembly; and
bending the welded wire assembly while maintaining the two wire segments beside each other in a side-by-side orientation such that the two wire segments are bent equally so as to form the hairpin conductor, wherein the hairpin conductor has a primary bend in the middle regions of the two wire segments to form an apex thereat, and first and second secondary bends in the two wire segments nearer to the apex than to the first and second ends to form respective first and second shoulders thereat.

12. The method of claim 11, wherein the bending of the welded wire assembly provides a first leg extending from the first shoulder to the first ends of the two wire segments and a second leg extending from the second shoulder to the second ends of the two wire segments, wherein the first and second legs are disposed parallel to each other.

13. The method of claim 11, wherein the welding step is performed by laser welding, micro tungsten inert gas (TIG) welding or resistance brazing.

14. The method of claim 11, further comprising:
extracting a length of wire from a coil of the wire;
straightening the length of wire to produce a run of straightened wire;
conditioning the run of straightened wire to assure a predetermined cross-sectional profile of the straightened wire; and
cutting the run of straightened wire to the predetermined length to produce the two straightened wire segments.

15. The method of claim 11, wherein, during the welding step, the two wire segments are maintained in a side-by-side orientation such that the first stripped end portions together present a first inner seam, a first outer seam and a first end face, the second stripped end portions together present a second inner seam, a second outer seam and a second end face and the stripped middle portions together present a middle inner seam and a middle outer seam, and
wherein the first stripped end portions are welded to each other by one or more seam welds along at least one of the first inner and outer seams or by an edge weld across the first end face and the second stripped end portions are welded to each other by one or more seam welds along at least one of the second inner and outer seams or by an edge weld across the second end face, or the stripped middle portions are welded to each other by one or more seam welds along at least one of the middle inner and outer seams.

16. A hairpin conductor for use in an electric motor stator, comprising:
two electrically conductive wire segments each having respective first and second ends and a respective middle region located between the respective first and second ends, wherein the two wire segments are disposed beside each other in a side-by-side orientation such that their first ends are disposed proximate each other and their second ends are disposed proximate each other;
wherein the first ends are welded to each other and the second ends are welded to each other and/or the middle regions are welded to each other, thereby providing a welded wire assembly; and wherein the welded wire assembly is bent such that the two wire segments are bent equally so as to form the hairpin conductor, wherein the hairpin conductor has a primary bend in the middle regions of the two wire segments to form an apex thereat and first and second secondary bends in the two wire segments nearer to the apex than to the first and second ends to form respective first and second shoulders thereat.

17. The hairpin conductor of claim 16, further comprising:
a first leg extending from the first shoulder to the first ends of the two wire segments and a second leg extending from the second shoulder to the second ends of the two wire segments, wherein the first and second legs are disposed parallel to each other.

18. The hairpin conductor of claim 16, wherein the two wire segments are coated with a dielectric material except for the respective first and second ends of each wire segment and/or at the respective middle region of each wire segment.

19. The hairpin conductor of claim 16, wherein the first ends together present a first inner seam, a first outer seam and a first end face and the second ends together present a second inner seam, a second outer seam and a second end face, and further comprising:
one or more seam welds formed along at least one of the first inner and outer seams or an edge weld across the first end face, thereby welding the first ends to each other, and one or more seam welds formed along at least one of the second inner and outer seams or an edge weld across the second end face, thereby welding the second ends to each other.

20. The hairpin conductor of claim 16, wherein the middle portions together present a middle inner seam and a middle outer seam, and further comprising:
one or more seam welds formed along at least one of the middle inner and outer seams, thereby welding the middle portions to each other.

* * * * *